United States Patent
Kono et al.

(10) Patent No.: US 6,940,371 B2
(45) Date of Patent: Sep. 6, 2005

(54) HIGH FREQUENCY DIELECTRIC CERAMIC COMPOSITION, DIELECTRIC RESONATOR, DIELECTRIC FILTER, DIELECTRIC DUPLEXER, AND COMMUNICATION DEVICE

(75) Inventors: Mizuki Kono, Yokaichi (JP); Tsutomu Tatekawa, Otsu (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 10/647,518

(22) Filed: Aug. 26, 2003

(65) Prior Publication Data

US 2004/0041662 A1 Mar. 4, 2004

(30) Foreign Application Priority Data

Aug. 30, 2002 (JP) .......................... 2002-253595
Jun. 27, 2003 (JP) .......................... 2003-184234

(51) Int. Cl.$^7$ .............................. H01P 7/10; C04B 35/46
(52) U.S. Cl. ..................................... 333/219.1; 501/136
(58) Field of Search ............................... 333/202, 219, 333/206, 219.1; 501/136

(56) References Cited

U.S. PATENT DOCUMENTS

| | | | | |
|---|---|---|---|---|
| 4,721,692 A | * | 1/1988 | Nishioka et al. | 501/134 |
| 6,025,291 A | * | 2/2000 | Murakawa | 501/136 |
| 6,549,094 B2 | * | 4/2003 | Takagi et al. | 333/134 |
| 6,645,896 B2 | * | 11/2003 | Okamoto et al. | 501/136 |
| 6,756,335 B2 | * | 6/2004 | Okawa | 501/136 |

FOREIGN PATENT DOCUMENTS

| | | | |
|---|---|---|---|
| EP | 1160221 A2 | * 12/2001 | ......... C04B/35/465 |
| JP | 11-071171 | 3/1999 | |
| JP | 11-106255 | 4/1999 | |
| JP | 11-130528 | 5/1999 | |
| JP | 11-278927 | 10/1999 | |
| JP | 2000-203934 | 7/2000 | |
| JP | 2001-072464 | 3/2001 | |
| JP | 2001-181028 | 7/2001 | |
| JP | 2001-206765 | 7/2001 | |
| JP | 2003-95736 | 4/2003 | |

OTHER PUBLICATIONS

Ferroelectrics 1997, vol. 196 pp. 205–209.

* cited by examiner

*Primary Examiner*—Seungsook Ham
(74) *Attorney, Agent, or Firm*—Dickstein, Shapiro, Morin & Oshinsky, LLP.

(57) ABSTRACT

A high frequency dielectric ceramic composition includes: as a major component a composition which contains a rare earth element (Re), Al, Sr, and Ti as metal elements and has a composition formula expressed by a molar ratio of $aRe_2O_3\text{-}bAl_2O_3\text{-}cSrO\text{-}dTiO_2$ in which a, b, c, and d satisfy the following formula; $0.113 \leq a \leq 0.172$, $0.111 \leq b \leq 0.171$, $0.322 \leq c \leq 0.388$, $0.323 \leq d \leq 0.396$, and $a+b+c+d=1.000$; and 0.01 to 2 parts by weight on a $Fe_2O_3$ conversion basis of Fe as an element, based on 100 parts by weight of the major component.

11 Claims, 4 Drawing Sheets

US 6,940,371 B2

HIGH FREQUENCY DIELECTRIC CERAMIC COMPOSITION, DIELECTRIC RESONATOR, DIELECTRIC FILTER, DIELECTRIC DUPLEXER, AND COMMUNICATION DEVICE

BACKGROUND OF THE INVENTION

1. Field of the Invention

The present invention relates to a high frequency dielectric ceramic composition for use in a high frequency region such as microwave and millimeter-wave regions, a dielectric resonator, a dielectric filter, a dielectric duplexer, and a communication device each using the high frequency dielectric ceramic composition.

2. Description of the Related Art

Heretofore, dielectric ceramics have been widely used for dielectric resonators, circuit substrate materials, and so forth which operate in a high frequency region such as microwave and millimeter-wave regions.

The dielectric characteristics required for the high frequency dielectric ceramics are as follows. (1) The wavelength of an electromagnetic wave is reduced to $1/(\in_r)^{1/2}$ in a dielectric. Accordingly, to meet requests for the reduction in size of the ceramics, it is required for the dielectric constants ($\in_r$) to be large. (2) The dielectric losses should be low, i.e., the Q values should be high. (3) The stability of the resonance frequencies for temperature should be high, i.e., the temperature coefficients ($\tau_f$) of the resonance frequencies should be near 0 (ppm/° C.).

Heretofore, as the above-described dielectric ceramics, $Re_2O_3$—$Al_2O_3$—$SrO$—$TiO_2$ (Re: rare earth element) type materials, and the materials containing Mn added thereto are disclosed, e.g., in Japanese Unexamined Patent Application Publication No. 11-71171 and Japanese Unexamined Patent Application Publication No. 2000-203934.

The $Re_2O_3$—$Al_2O_3$—$SrO$—$TiO_2$ type materials of the related art are superior in that the dielectric constants ($\in_r$) are high, the Q values are high, and the temperature coefficient ($\tau_f$) of the resonance frequency can be controlled to be near zero. However, with recent advancement of the communication enterprises, high frequency electronic parts have been required to have higher qualities. Moreover, materials for dielectric ceramics have been required to have a higher Q value than the related art materials.

SUMMARY OF THE INVENTION

Accordingly, it is an object of the present invention to provide a high frequency dielectric ceramic composition which has a higher Q value than the related art $Re_2O_3$—$Al_2O_3$—$SrO$—$TiO_2$ type material, and have such a high dielectric constant ($\in_r$) as that of the related art $Re_2O_3$—$Al_2O_3$—$SrO$—$TiO_2$ type material and a small temperature coefficient ($\tau_f$) of the resonance frequency, and to provide a dielectric resonator, a dielectric filter, a dielectric duplexer, and a communication device each using the high frequency dielectric ceramic composition.

According to the present invention, there is provided a high frequency dielectric ceramic composition which comprises: a major component, a composition of which contains a rare earth element (Re), Al, Sr, and Ti as metal elements, wherein a composition formula expressed by a molar ratio of $aRe_2O_3$-$bAl_2O_3$-$cSrO$-$dTiO_2$ in which a, b, c, and d satisfy the following formula; $0.113 \leq a \leq 0.172$, $0.111 \leq b \leq 0.171$, $0.322 \leq c \leq 0.388$, $0.323 \leq d \leq 0.396$, and $a+b+c+d=1.000$; and a sub-component, which 0.01 to 2 parts by weight of Fe as an element on the basis of a $Fe_2O_3$, with respect to 100 parts by weight of the major component.

Preferably, the rare earth element (Re) comprises La, or La and at least one of the other rare earth elements.

Preferably, there is provided a dielectric resonator including a dielectric ceramic, wherein the dielectric ceramic is made of the above-described high frequency dielectric ceramic composition.

Preferably, there is provided a dielectric filter which comprises the above-described dielectric resonator and an external coupling means.

Preferably, there is provided a dielectric duplexer which comprises at least two dielectric filters, input-output connecting means connected to the dielectric filters, respectively, and an antenna-connecting means connected to both of the dielectric filters, at least one of the dielectric filters being the above-described dielectric filter.

Preferably, there is provided a communication device which comprises the above-described dielectric duplexer, a transmission circuit connected to at least one of the input-output connecting means for the dielectric duplexers, a reception circuit connected to at least one of the input-output connecting means which is different from the above-described input-output connecting means to which the transmission circuit is connected, and an antenna connected to the antenna-connecting means for the dielectric duplexer.

The high frequency dielectric ceramic composition has a high Q value compared to the related art $Re_2O_3$—$Al_2O_3$—$SrO$—$TiO_2$ type material, and a high dielectric constant ($\in_r$) and a small temperature coefficient ($\tau_f$) of the resonance frequency which are on the same level of those of the related art $Re_2O_3$—$Al_2O_3$—$SrO$—$TiO_2$ type material.

Thus, the dielectric resonator, the dielectric filter, the dielectric duplexer, and the communication device, which are formed of the above-described high frequency dielectric ceramic composition, have superior characteristics, respectively.

DESCRIPTION OF THE PREFERRED EMBODIMENTS

Figure 1:
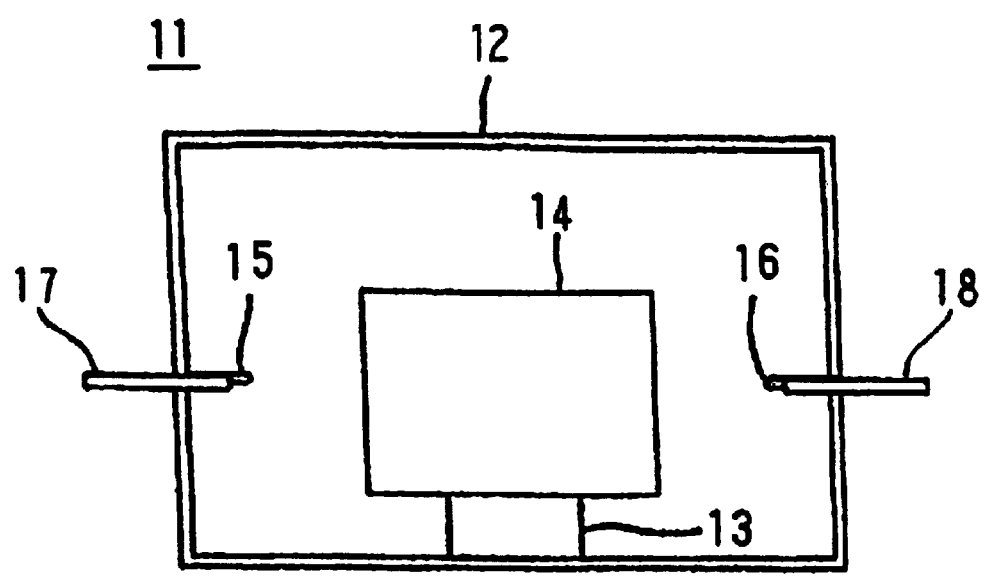
FIG. 1 is a cross-sectional view of a TE01δ mode dielectric resonator which is an example of the dielectric resonator of the present invention.

FIG. 1 is a cross-sectional view of a TE01δ mode dielectric resonator 11 which is an example of the dielectric resonator of the present invention. Referring to FIG. 1, a dielectric resonator 11 is provided with a metallic case 12. A columnar dielectric ceramic 14, supported by a support 13, is arranged in the space within the metallic case 12. A coupling loop 15 is formed between the core conductor of a coaxial cable 17 and the outer conductor thereof, which functions as an input terminal. Moreover, a coupling loop 16 is formed between the core conductor of a coaxial cable 18 and the outer conductor thereof, which functions as an output terminal. Each terminal is supported by the metallic case 12 with each outer conductor being electrically connected to the metallic case 12. The dielectric ceramic 14 is electromagnetic field coupled with the input and output terminals to be operated. Only a signal having a predetermined frequency, input via the input terminal, is output via the output terminal. The dielectric ceramic 14 provided in the dielectric resonator 11 is formed of the high frequency dielectric ceramic composition of the present invention.

Figure 2:
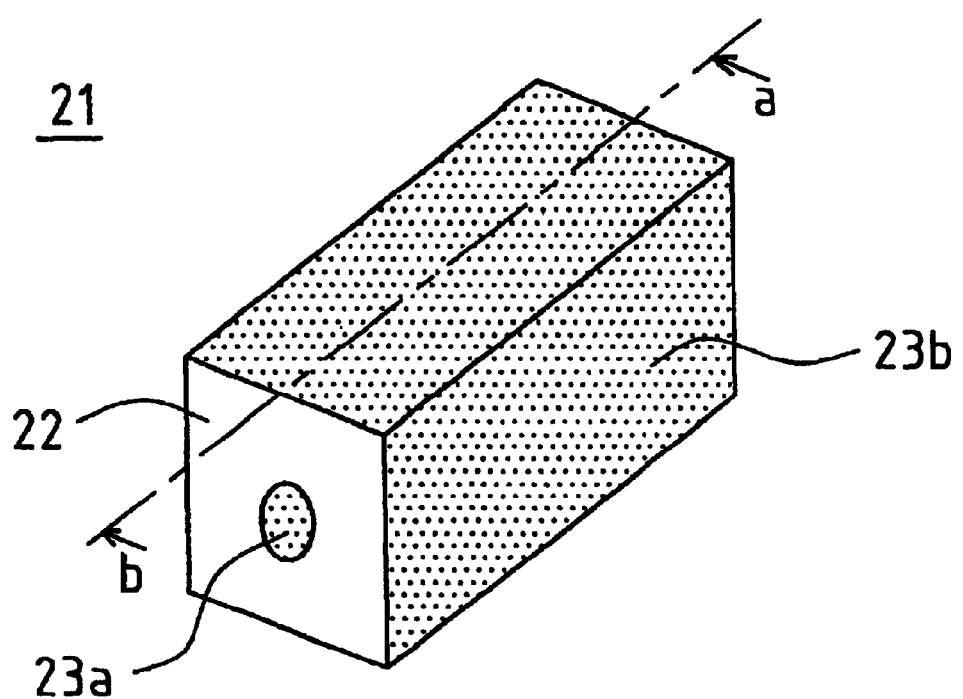
FIG. 2 is a perspective view of a TEM mode dielectric resonator which is another example of the dielectric resonator of the present invention.
Figure 3:
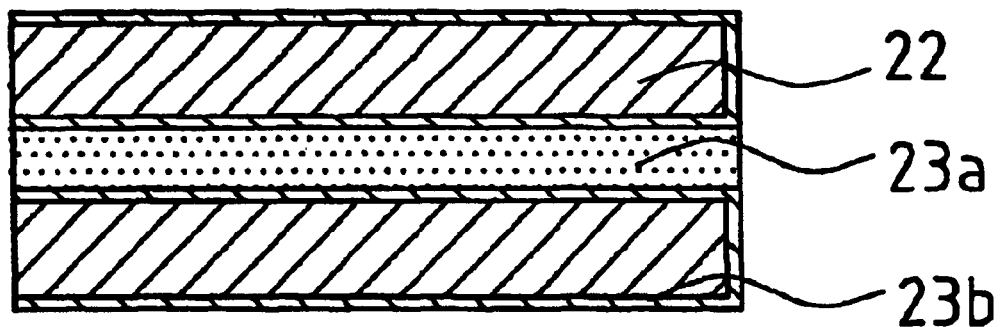
FIG. 3 is a cross-sectional view taken along plane a-b of the dielectric resonator shown in FIG. 2.

FIG. 2 is a perspective view of a TEM mode dielectric resonator which is another example of the dielectric resonator of the present invention. FIG. 3 is a cross-sectional view taken along plane a-b of a dielectric resonator 21 shown in FIG. 2. Referring to FIGS. 2 and 3, the dielectric resonator 21 comprises a prism-shaped dielectric ceramic 22 having a through-hole. An inner conductor 23a is formed in the through-hole. An outer conductor 23b is formed in the periphery of the ceramic 22. The Input-output terminals, i.e., external coupling means are electromagnetic field coupled with the dielectric ceramic 22 to be operated as a dielectric resonator. The dielectric ceramic 22 constituting the dielectric resonator 21 is formed of the high frequency dielectric ceramic composition of the present invention.

FIG. 1 shows an example of the TE01δ mode dielectric resonator, and FIG. 2 shows an example of the prism-shaped TEM mode dielectric resonator, as described above. These dielectric resonators are not restrictive. The high frequency dielectric ceramic composition of the present invention may be also used for dielectric resonators having other shapes and other TEM modes, TE modes and TM modes.

Figure 4:
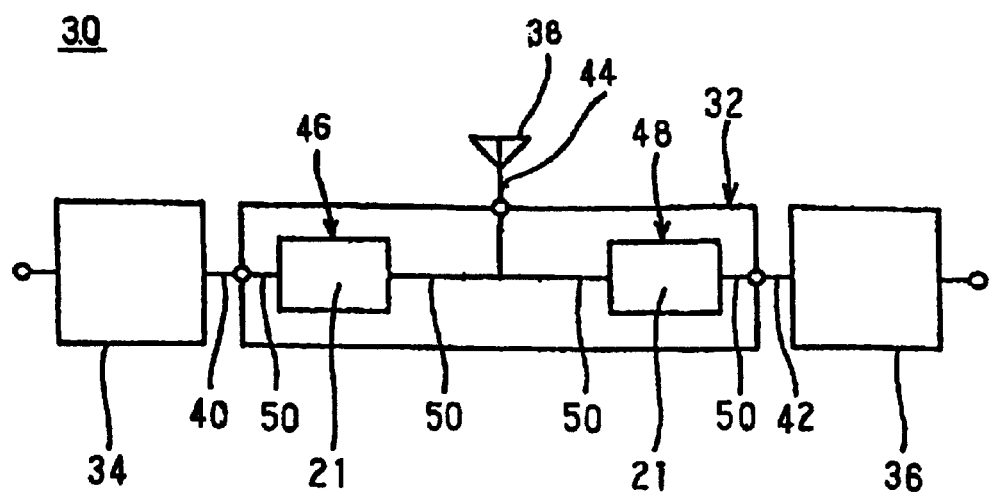
FIG. 4 is a block diagram of an example of the communication device of the present invention.

FIG. 4 is a block diagram of an example of the communication device of the present invention. The communication device 30 comprises a dielectric duplexer 32, a transmission circuit 34, a reception circuit 36, and an antenna 38. The transmission circuit 34 is electrically connected to an output-connecting means 40 of the dielectric duplexer 32. The reception circuit 36 is connected to an output-connecting means 42 of the dielectric duplexer 32. The reception circuit 36 is connected to an output-connecting means 42 of the dielectric duplexer 32. The antenna 38 is connected to an antenna-connecting means 44 of the dielectric duplexer 32. The dielectric duplexer 32 contains two dielectric filters 46 and 48. Each of the dielectric filters 46 and 48 comprises the dielectric resonator of the present invention having an external-coupling means connected thereto. For example, each of the dielectric filters 46 and 48 comprises external-coupling means 50 connected to the input-output terminals of the dielectric resonator 11 shown in FIG. 1. One dielectric filter 46 is connected between the input-connecting means 40 and the other dielectric filter 48. The other dielectric filter 48 is connected between the one dielectric filter 46 and the output-connecting means 42.

The high frequency dielectric ceramic composition of the present invention contains as a major component a composition containing as metal elements a rare earth element (Re), Al, Sr, and Ti, having a composition formula by a molar ratio of $aRe_2O_3\text{-}bAl_2O_3\text{-}cSrO\text{-}dTiO_2$ in which a, b, c, and d satisfy formulae of $0.113 \leq a \leq 0.172$, $0.111 \leq b \leq 0.171$, $0.322 \leq c \leq 0.388$, $0.323 \leq d \leq 0.396$, and $a+b+c+d=1.000$. The ceramic composition contains 0.01 to 2 parts by weight, on a $Fe_2O_3$ conversion basis, of Fe as an element, based on 100 parts by weight of the major component.

By employing the above-defined composition range, the high frequency dielectric ceramic composition can be provided which has a higher Q value than the related art $Re_2O_3$—$Al_2P_3$—$SrO$—$TiO_2$ type material, such a high dielectric constant ($\in_r$) as the related art $Re_2O_3$—$Al_2P_3$—$SrO$—$TiO_2$ type material, and a small temperature coefficient ($\tau^f$) of the resonance frequency.

EXAMPLES

Hereinafter, the present invention will be described with reference of more specific examples.

Example 1

As starting materials, powders of $La_2O_3$ which is a rare earth oxide ($Re_2O_3$), aluminum oxide ($Al_2O_3$), strontium carbonate ($SrCO_3$), and titanium oxide ($TiO_2$) each having a high purity were prepared.

These raw materials were mixed so as to obtain compositions having a composition formula of $aRe_2O_3\text{-}bAl_2O_3\text{-}cSrO\text{-}dTiO_2$ in which the coefficients (molar ratio) a, b, c, and d are indicated in Tables 2 and 3.

TABLE 1

| Sample | La2O3 a | Al2O3 b | SrO c | TiO2 d | Fe2O3 (parts by weight) | εr | Q × f (GHz) | Q × f value-increasing ratio (%) | τf (ppm/° C.) |
|---|---|---|---|---|---|---|---|---|---|
| 1 * | 0.137 | 0.137 | 0.363 | 0.363 | 0 | 39 | 67800 | — | 1.1 |
| 2 | 0.137 | 0.137 | 0.363 | 0.363 | 0.5 | 39 | 80600 | 18.9 | 2.1 |
| 3 * | 0.136 | 0.138 | 0.361 | 0.365 | 0 | 38 | 64000 | — | 0.2 |
| 4 | 0.136 | 0.138 | 0.361 | 0.365 | 0.5 | 38 | 75400 | 17.8 | 0.4 |
| 5 * | 0.148 | 0.139 | 0.346 | 0.367 | 0 | 38 | 57600 | — | 4.8 |
| 6 | 0.148 | 0.139 | 0.346 | 0.367 | 0.5 | 38 | 67000 | 16.3 | 4.9 |
| 7 * | 0.142 | 0.139 | 0.364 | 0.355 | 0 | 38 | 63400 | — | −1.5 |
| 8 | 0.142 | 0.139 | 0.364 | 0.355 | 0.5 | 38 | 75400 | 18.9 | −2.1 |
| 9 * | 0.153 | 0.121 | 0.367 | 0.359 | 0 | 37 | 52400 | — | −5.7 |
| 10 | 0.153 | 0.121 | 0.367 | 0.359 | 0.5 | 37 | 60900 | 16.3 | −5.3 |
| 11 * | 0.143 | 0.147 | 0.358 | 0.352 | 0 | 38 | 62500 | — | −3.8 |
| 12 | 0.143 | 0.147 | 0.358 | 0.352 | 0.5 | 38 | 77600 | 24.2 | −4.4 |
| 13 * | 0.151 | 0.148 | 0.354 | 0.347 | 0 | 37 | 67800 | — | −7.2 |
| 14 | 0.151 | 0.148 | 0.354 | 0.347 | 0.5 | 37 | 77700 | 14.6 | −8.5 |
| 15 * | 0.154 | 0.154 | 0.346 | 0.346 | 0 | 37 | 64600 | — | −10 |
| 16 | 0.154 | 0.154 | 0.346 | 0.346 | 0.5 | 37 | 76400 | 18.2 | −9.4 |
| 17 * | 0.139 | 0.159 | 0.331 | 0.371 | 0 | 33 | 50500 | — | −1.4 |
| 18 | 0.139 | 0.159 | 0.331 | 0.371 | 0.5 | 33 | 59800 | 18.4 | −1.1 |
| 19 * | 0.156 | 0.160 | 0.345 | 0.339 | 0 | 37 | 68200 | — | −11.8 |

TABLE 1-continued

| Sample | La2O3 a | Al2O3 b | SrO c | TiO2 d | Fe2O3 (parts by weight) | $\epsilon_r$ | Q × f (GHz) | Q × f value-increasing ratio (%) | τf (ppm/° C.) |
|---|---|---|---|---|---|---|---|---|---|
| 20 | 0.156 | 0.160 | 0.345 | 0.339 | 0.5 | 37 | 80100 | 17.4 | −10.9 |
| 21 * | 0.150 | 0.157 | 0.340 | 0.353 | 0 | 34 | 64200 | — | −23.8 |
| 22 | 0.150 | 0.157 | 0.340 | 0.353 | 0.5 | 34 | 76300 | 18.9 | −24.9 |
| 23 * | 0.162 | 0.165 | 0.337 | 0.336 | 0 | 36 | 70700 | — | −13.9 |
| 24 | 0.162 | 0.165 | 0.337 | 0.336 | 0.5 | 36 | 84400 | 19.4 | −14.7 |
| 25 * | 0.165 | 0.168 | 0.330 | 0.337 | 0 | 35 | 69800 | — | −19.5 |
| 26 | 0.165 | 0.168 | 0.330 | 0.337 | 0.5 | 35 | 81900 | 17.4 | −18.4 |
| 27 * | 0.171 | 0.171 | 0.329 | 0.329 | 0 | 33 | 62300 | — | −22.4 |
| 28 | 0.171 | 0.171 | 0.329 | 0.329 | 0.5 | 33 | 73700 | 18.3 | −23.4 |
| 29 * | 0.161 | 0.161 | 0.355 | 0.323 | 0 | 36 | 53400 | — | −14.8 |
| 30 | 0.161 | 0.161 | 0.355 | 0.323 | 0.5 | 36 | 65300 | 22.3 | −15 |
| 31 * | 0.172 | 0.168 | 0.330 | 0.330 | 0 | 31 | 62000 | — | −27.7 |
| 32 | 0.172 | 0.168 | 0.330 | 0.330 | 0.5 | 31 | 72400 | 16.7 | −28.6 |
| 33 * | 0.141 | 0.161 | 0.322 | 0.376 | 0 | 33 | 48100 | — | −18.4 |
| 34 | 0.141 | 0.161 | 0.322 | 0.376 | 0.5 | 33 | 57400 | 19.4 | −17.3 |
| 35 * | 0.132 | 0.142 | 0.366 | 0.360 | 0 | 40 | 65900 | — | 2.4 |
| 36 | 0.132 | 0.142 | 0.366 | 0.360 | 0.5 | 40 | 76600 | 16.2 | 3.3 |
| 37 * | 0.129 | 0.129 | 0.371 | 0.371 | 0 | 40 | 67800 | — | 5.1 |
| 38 | 0.129 | 0.129 | 0.371 | 0.371 | 0.5 | 40 | 80100 | 18.2 | 6.1 |
| 39 * | 0.150 | 0.121 | 0.368 | 0.361 | 0 | 38 | 45300 | — | −6.2 |
| 40 | 0.150 | 0.121 | 0.368 | 0.361 | 0.5 | 38 | 54000 | 19.2 | −5.4 |

TABLE 2

| Sample | La2O3 a | Al2O3 b | SrO c | TiO2 d | Fe2O3 (parts by weight) | $\epsilon_r$ | Q × f (GHz) | Q × f value-increasing ratio (%) | τf (ppm/° C.) |
|---|---|---|---|---|---|---|---|---|---|
| 41 * | 0.125 | 0.128 | 0.380 | 0.367 | 0 | 41 | 62400 | — | 8.4 |
| 42 | 0.125 | 0.128 | 0.380 | 0.367 | 0.5 | 41 | 73400 | 17.6 | 8.5 |
| 43 * | 0.122 | 0.119 | 0.382 | 0.377 | 0 | 42 | 57700 | — | 15.4 |
| 44 | 0.122 | 0.119 | 0.382 | 0.377 | 0.5 | 42 | 68500 | 18.8 | 15.9 |
| 45 * | 0.117 | 0.152 | 0.343 | 0.388 | 0 | 40 | 47400 | — | 5.1 |
| 46 | 0.117 | 0.152 | 0.343 | 0.388 | 0.5 | 40 | 56000 | 18.2 | 5.9 |
| 47 * | 0.144 | 0.119 | 0.388 | 0.349 | 0 | 44 | 42300 | — | 10.2 |
| 48 | 0.144 | 0.119 | 0.388 | 0.349 | 0.5 | 44 | 50300 | 18.9 | 10.9 |
| 49 * | 0.113 | 0.113 | 0.387 | 0.387 | 0 | 44 | 49800 | — | 24.3 |
| 50 | 0.113 | 0.113 | 0.387 | 0.387 | 0.5 | 44 | 59000 | 18.4 | 24.7 |
| 51 * | 0.141 | 0.118 | 0.345 | 0.396 | 0 | 38 | 41400 | — | 14.3 |
| 52 | 0.141 | 0.118 | 0.345 | 0.396 | 0.5 | 38 | 50700 | 22.4 | 14.9 |
| 53 * | 0.115 | 0.111 | 0.384 | 0.390 | 0 | 45 | 53500 | — | 27.1 |
| 54 | 0.115 | 0.111 | 0.384 | 0.390 | 0.5 | 45 | 62400 | 16.7 | 26.4 |
| 55 * | 0.107 | 0.119 | 0.384 | 0.390 | 0 | 46 | 43200 | — | 35 |
| 56 * | 0.159 | 0.179 | 0.331 | 0.331 | 0 | 29 | 58200 | — | −41 |
| 57 * | 0.085 | 0.085 | 0.415 | 0.415 | 0 | 57 | 40200 | — | 64 |
| 58 * | 0.119 | 0.107 | 0.384 | 0.390 | 0 | 48 | 36000 | — | 38 |
| 59 * | 0.174 | 0.138 | 0.347 | 0.341 | 0 | 34 | 23600 | — | 15 |
| 60 * | 0.117 | 0.114 | 0.396 | 0.373 | 0 | 49 | 43200 | — | 38 |
| 61 * | 0.194 | 0.194 | 0.306 | 0.306 | 0 | 27 | 53200 | — | −42 |
| 62 * | 0.170 | 0.166 | 0.361 | 0.303 | 0 | 29 | 52700 | — | −34 |
| 63 * | 0.170 | 0.166 | 0.302 | 0.362 | 0 | 25 | 32200 | — | −18 |
| 64 * | 0.117 | 0.114 | 0.371 | 0.398 | 0 | 52 | 37800 | — | 49 |

Hereinafter, the mixed powder was wet-mixed for 16 hours by means of a ball mill. Then, water was removed therefrom, and the powder was dried and calcined at a temperature of 1100 to 1200° C. for 3 hours. Thus, the calcined powder as the major component was produced.

Subsequently, 0.5 parts by weight based on 100 parts by weight of the major component of iron oxide ($Fe_2O_3$) as an Fe compound was added to the calcined powder as shown in Tables 1 and 2. Then, an appropriate amount of a binder was added, and the powder was wet-crushed for 16 hours by means of a ball mill. Thus, an adjusted powder was produced.

Thereafter, the adjusted powder was press-formed into a disk shape at a pressure of 1000 to 2000 kg/cm² and fired in the atmosphere at a temperature of 1500 to 1650° C. for 4 hours. Thus, a sintered piece having a diameter of 10 mm and a thickness of 5 mm was obtained.

The dielectric constant ($\epsilon_r$) and the Q value of the sintered piece were measured at a frequency (f) of 6 to 8 GHz by the both-end shortening type dielectric resonator method. The Q×f value was calculated. The temperature coefficient ($\tau_f$, 25° C. to 55° C.) of the resonance frequency was measured based on the TE010δ mode resonance frequency. Tables 1 and 2 show the results. It should be noted that in Tables 1 and 2, the samples with sample-numbers having "star marks" depart from the scope of the present invention. The other samples are within the scope of the present invention.

As seen in Tables 1 and 2, in the case in which the major components having a composition formula of $aRe_2O_3$-$bAl_2O_3$-$cSrO$-$dTiO_2$ in which a, b, c, and d satisfy formulae of $0.113 \leq a \leq 0.172$, $0.111 \leq b \leq 0.171$, $0.322 \leq c \leq 0.388$, $0.323 \leq d \leq 0.396$, and $a+b+c+d=1.000$ as in Samples 1 to 54, the sintered pieces have superior microwave dielectric characteristics. That is, the dielectric constants are high, i.e., at least 30, the Q×f values are high, i.e., at least 40,000 GHz, and the absolute values of the temperature coefficients ($\tau f$) of the resonance frequency are within 30 ppm/° C., i.e., nearly zero.

On the other hand, in the case in which the compositions of the major components departs from the above-described range as seen in Samples 55 to 64, undesirably, the dielectric constants ($\epsilon_r$) are less than 30, the Q×f values are less than 40,000 GHz, or the temperature coefficients ($\tau_f$) of the resonance frequencies exceeds 30 (ppm/° C.).

Then, as seen in Samples having even sample-numbers in the range of 1 to 54, by addition of 0.5 parts by weight on a $Fe_2O_3$ conversion basis of Fe as an element, based on 100 parts by weight of a major component of which the composition formula is in the above-described range to exhibits a superior microwave dielectric characteristic, the Q×f values are significantly high compared to those of the major components of which the compositions are the same as those of the above-described Samples except that no $Fe_2O_3$ is added (the sample having an odd number which is smaller by 1 than each of the sample having the above-mentioned even numbers). Thus, the Q value can be significantly increased by incorporating the Fe element into a $Re_2O_3$—$Al_2O_3$—$SrO$—$TiO_2$ type composition.

Example 2

As starting materials, powders of $La_2O_3$ as a rare earth oxide ($Re_2O_3$), aluminum oxide ($Al_2O_3$), strontium carbonate ($SrCO_3$), and titanium oxide ($TiO_2$) each having a high purity were prepared.

Subsequently, the raw materials were mixed so as to obtain compositions having a composition formula of $0.137La_2O_3$-$0.137Al_2O_3$-$0.363SrO$-$0.363TiO_2$ (the coefficients are expressed by molar ratios). The composition was processed in a similar manner to that for Example 1. Thus, the calcined powders as the major components were obtained.

Subsequently, 0.01 to 4 parts by weight based on 100 parts by weight of the major component of iron oxide ($Fe_2O_3$) was added to the calcined powder as shown in Table 3. Then, an appropriate amount of a binder was added. The powders were wet-crushed for 16 hours by means of a ball mill. Thus, the adjusted powders were produced. Thereafter, sintered pieces were produced in a similar manner to that for Example 1.

For the produced sintered pieces, the dielectric constant ($\epsilon_r$), the Q×f value, and the temperature coefficient ($\tau_f$) of the resonance frequency were determined. Table 3 shows the results. In Table 3, the samples having the sample numbers with star marks depart from the scope of the present invention. All of the other samples are within the scope of the present invention.

Referring to Table 3, as seen in Samples 72 to 77, the Q×f value can be enhanced by addition of 0.01 to 2 parts by weight of $Fe_2O_3$ based on 100 parts by weight of the major component, as compared with the case in which $Fe_2O_3$ is not added. To the contrary, when the addition amount of $Fe_2O_3$ exceeds 2 parts by weight as in Samples 78 and 79, the Q×f value is decreased. Accordingly, the content on an $Fe_2O_3$ conversion basis of Fe as an element is preferably in the range of 0.01 to 2 parts by weight based on 100 parts by weight of the major component.

Example 3

As starting materials, powders of $La_2O_3$, $Nd_3O_3$, $Ce_2O_3$, $Pr_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$, each having a high purity, were prepared. Moreover, powders of aluminum oxide ($Al_2O_3$), strontium carbonate ($SrCO_3$), and titanium oxide ($TiO_2$) were prepared.

Subsequently, these raw materials were mixed so as to obtain a composition having a composition formula of $0.137Re_2O_3$-$0.137Al_2O_3$-$0.363SrO$-$0.363TiO_2$ (the coefficients are expressed by a molar ratio) in which the Re of $Re_2O_3$ is an element shown in Table 4. The mixed materials were processed in a similar manner to that for Example 1 to obtain calcined powders as the major components.

TABLE 3

| Sample | La2O3 a | Al2O3 b | SrO c | TiO2 d | Fe2O3 (parts by weight) | εr | Q × f (GHz) | Q × f value-increasing ratio (%) | τf (ppm/° C.) |
|---|---|---|---|---|---|---|---|---|---|
| 71 * | 0.137 | 0.137 | 0.363 | 0.363 | 0 | 39 | 67800 | — | 1.1 |
| 72 | 0.137 | 0.137 | 0.363 | 0.363 | 0.5 | 39 | 80600 | 18.9 | 2.1 |
| 73 | 0.137 | 0.137 | 0.363 | 0.363 | 0.01 | 39 | 73700 | 8.7 | 1.4 |
| 74 | 0.137 | 0.137 | 0.363 | 0.363 | 0.02 | 39 | 75600 | 11.5 | 1.7 |
| 75 | 0.137 | 0.137 | 0.363 | 0.363 | 0.05 | 39 | 76700 | 13.2 | 1.6 |
| 76 | 0.137 | 0.137 | 0.363 | 0.363 | 1 | 39 | 79500 | 17.3 | 2.3 |
| 77 | 0.137 | 0.137 | 0.363 | 0.363 | 2 | 40 | 70900 | 4.5 | 2.5 |
| 78 * | 0.137 | 0.137 | 0.363 | 0.363 | 3 | 40 | 64100 | −5.4 | 3.4 |
| 79 * | 0.137 | 0.137 | 0.363 | 0.363 | 4 | 40 | 56100 | −17.2 | 3.4 |

TABLE 4

| Sample | Re (Rare earth element) | Fe2O3 (parts by weight) | εr | Q × f (GHz) | Q × f value-increasing ratio (%) | τf (ppm/° C.) |
|---|---|---|---|---|---|---|
| 81 * | 0.8 La—0.2 Nd | 0 | 39 | 64300 | — | 1.3 |
| 82 | 0.8 La—0.2 Nd | 0.5 | 39 | 73500 | 14.3 | 1.5 |
| 83 * | 0.5 La—0.5 Nd | 0 | 38 | 62500 | — | 0.8 |
| 84 | 0.5 La—0.5 Nd | 0.5 | 38 | 70400 | 12.7 | 1.5 |
| 85 * | 0.2 La—0.8 Nd | 0 | 38 | 61000 | — | 0.5 |
| 86 | 0.2 La—0.8 Nd | 0.5 | 38 | 69700 | 14.3 | 0.0 |
| 87 * | 0.8 La—0.2 Ce | 0 | 39 | 59800 | — | 0.7 |
| 88 | 0.8 La—0.2 Ce | 0.5 | 39 | 69800 | 16.7 | 0.9 |
| 89 * | 0.8 La—0.2 Pr | 0 | 39 | 62300 | — | 0.8 |
| 90 | 0.8 La—0.2 Pr | 0.5 | 39 | 72100 | 15.8 | 1.2 |
| 91 * | 0.8 La—0.2 Pm | 0 | 39 | 61900 | — | 0.4 |
| 92 | 0.8 La—0.2 Pm | 0.5 | 39 | 70800 | 14.3 | 0.1 |
| 93 * | 0.8 La—0.2 Sm | 0 | 39 | 62700 | — | -0.2 |
| 94 | 0.8 La—0.2 Sm | 0.5 | 39 | 73700 | 17.6 | 0.3 |
| 95 * | 0.8 La—0.2 Eu | 0 | 39 | 52300 | — | 0.1 |
| 96 | 0.8 La—0.2 Eu | 0.5 | 39 | 60400 | 15.4 | -0.2 |
| 97 * | 0.8 La—0.2 Gd | 0 | 38 | 57800 | — | -0.4 |
| 98 | 0.8 La—0.2 Gd | 0.5 | 38 | 64800 | 12.1 | 0.5 |
| 99 * | 0.8 La—0.2 Tb | 0 | 38 | 59800 | — | -0.7 |
| 100 | 0.8 La—0.2 Tb | 0.5 | 38 | 70700 | 18.2 | -0.2 |
| 101 * | 0.8 La—0.2 Dy | 0 | 38 | 61500 | — | -0.1 |
| 102 | 0.8 La—0.2 Dy | 0.5 | 38 | 71300 | 16.0 | 0.7 |
| 103 * | 0.8 La—0.2 Ho | 0 | 38 | 57800 | — | -0.9 |
| 104 | 0.8 La—0.2 Ho | 0.5 | 38 | 67300 | 16.4 | -1.1 |
| 105 * | 0.8 La—0.2 Er | 0 | 38 | 57400 | — | -0.4 |
| 106 | 0.8 La—0.2 Er | 0.5 | 38 | 67200 | 17.0 | -0.7 |
| 107 * | 0.8 La—0.2 Tm | 0 | 38 | 59100 | — | -0.8 |
| 108 | 0.8 La—0.2 Tm | 0.5 | 38 | 68100 | 15.3 | -0.3 |
| 109 * | 0.8 La—0.2 Yb | 0 | 37 | 54300 | — | -1.3 |
| 110 | 0.8 La—0.2 Yb | 0.5 | 37 | 62400 | 14.9 | 0.1 |
| 111 * | 0.8 La—0.2 Lu | 0 | 37 | 56200 | — | -1.2 |
| 112 | 0.8 La—0.2 Lu | 0.5 | 37 | 63700 | 13.4 | 0.4 |
| 113 * | 0.5 La—0.2 Nd—0.3 Ce | 0 | 38 | 61300 | — | 0.2 |
| 114 | 0.5 La—0.2 Nd—0.3 Ce | 0.5 | 38 | 68900 | 12.4 | 1.1 |
| 115 * | 0.2 La—0.4 Sm—0.4 Yb | 0 | 36 | 56900 | — | -1.7 |
| 116 | 0.2 La—0.4 Sm—0.4 Yb | 0.5 | 36 | 67000 | 17.8 | -0.2 |
| 117 * | 0.3 La—0.4 Eu—0.3 Dy | 0 | 34 | 55700 | — | -2.8 |
| 118 | 0.3 La—0.4 Eu—0.3 Dy | 0.5 | 34 | 64300 | 15.4 | -3.2 |

Thereafter, 0.5 parts by weight based on 100 parts by weight of each major component of iron oxide ($Fe_2O_3$) was added to the each calcined powder, and moreover, an appropriate amount of a binder was added as shown in Table 4. Then, the mixtures were wet-crushed for 16 hours by means of a ball mill to obtain adjusted powders. The powders were processed in a similar manner as that for Example 1 to produce sintered pieces.

For the sintered pieces, the dielectric constant ($\epsilon_r$), the Q×f value, and the temperature coefficient ($\tau_f$) of the resonance frequency were determined. Table 4 shows these results. The samples having sample-numbers with a star mark shown in Table 4 depart from the scope of the present invention, and all of the other samples are within the scope of the present invention.

As seen in Table 4, for the sintered pieces each having a part of La substituted by another rare earth element, the Q×f value can be also enhanced by addition of $Fe_2O_3$ as seen in Samples having even numbers in the range of 81 to 118, as compared to Samples having no $Fe_2O_3$ added thereto (the Sample having the odd number which is smaller by 1 than each Sample having an even number).

In the above-described Examples, iron oxide ($Fe_2O_3$) is employed as the compound containing Fe as an element. Compounds containing Fe as an element such as iron oxides of FeO and $Fe_3O_4$, sulfates, chloride or the life containing Fe as an element may be used. In this case, similar advantages can be also obtained.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A dielectric resonator, comprising:

a dielectric ceramic comprising:

a major component which contains a rare earth element (Re), Al, Sr, and Ti as metal elements, wherein a composition formula of the major component is expressed by a molar ratio of $aRe_2O_3$-$bAl_2O_3$-$cSrO$-$dTiO_2$ in which a, b, c, and d satisfy the following formula;

$0.113 \leq a \leq 0.172$, $0.111 \leq b \leq 0.171$, $0.322 \leq c \leq 0.388$, $0.323 \leq d \leq 0.396$, and $a+b+c+d=1.000$; and a sub-component which contains 0.01 to 2 parts by weight of Fe as an element on the basis of $Fe_2O_3$, with respect to 100 parts by weight of the major component;

a metallic case within which the dielectric ceramic is arranged; and a support within the metallic case for supporting the dielectric ceramic.

2. The dielectric resonator according to claim 1, wherein the dielectric resonator is a TE01δ mode dielectric resonator.

3. The dielectric resonator according to claim 1, wherein the dielectric ceramic includes a through-hole, an inner conductor formed in the through-hole, and an outer conductor formed on at least a portion of a periphery of the dielectric ceramic.

4. The dielectric resonator according to claim 1, wherein the dielectric resonator is a TEM mode dielectric resonator.

5. The dielectric resonator according to claim 1, wherein the dielectric ceramic has a dielectric constant of at least 30, a Q×f value of at least 40,000 GHz, and an absolute value of a temperature coefficient of a resonant frequency less than 30 ppm/° C.

6. The dielectric resonator according to claim 1, wherein the rare earth element (Re) comprises La.

7. The dielectric resonator according to claim 1, wherein the rare earth element (Re) comprises La and at least one other rare earth elements.

8. A dielectric filter comprising the dielectric resonator defined in claim 1 and an external coupling means coupled to the dielectric ceramic.

9. The dielectric filter according to claim 8, wherein the external coupling means include an input terminal coupled to the dielectric ceramic; and an output terminal coupled to the dielectric ceramic.

10. A dielectric duplexer comprising at least two dielectric filters, input-output connecting means connected to the dielectric filters, respectively, and an antenna-connecting means connected to both of the dielectric filters, at least one of the dielectric filters being the dielectric filter defined in claim 8.

11. A communication device comprising the dielectric duplexer defined in claim 10, a transmission circuit connected to at least one of the input-output connecting means, a reception circuit connected to a different one of the input-output connecting means that the transmission circuit is connected, and an antenna connected to the antenna-connecting means.

* * * * *